(12) United States Patent
Kuwajima

(10) Patent No.: US 10,762,923 B2
(45) Date of Patent: Sep. 1, 2020

(54) HEAD SUPPORT MECHANISM FOR A MAGNETIC DISK DRIVE WITH A SLIDER THAT HAS A HEAD ELEMENT

(71) Applicant: TDK CORPORATION, Tokyo (JP)

(72) Inventor: Hideki Kuwajima, Kyoto (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/672,574

(22) Filed: Nov. 4, 2019

(65) Prior Publication Data
US 2020/0143828 A1    May 7, 2020

(30) Foreign Application Priority Data

Nov. 6, 2018   (JP) ................................. 2018-208869

(51) Int. Cl.
*G11B 5/48*          (2006.01)

(52) U.S. Cl.
CPC ............ *G11B 5/4873* (2013.01); *G11B 5/483* (2015.09); *G11B 5/4833* (2013.01)

(58) Field of Classification Search
CPC ..... G11B 5/4873; G11B 5/4833; G11B 5/483; G11B 5/4826; G11B 5/4853; G11B 5/4813
See application file for complete search history.

(56) References Cited

U.S. PATENT DOCUMENTS

| | | | | |
|---|---|---|---|---|
| 6,215,629 B1 * | 4/2001 | Kant | ................... | G11B 5/5552 360/290 |
| 6,760,196 B1 * | 7/2004 | Niu | ...................... | G11B 5/5552 360/245 |
| 8,310,790 B1 * | 11/2012 | Fanslau, Jr. | ............ | G11B 5/483 360/294.4 |
| 8,834,660 B1 * | 9/2014 | Scheele | .................... | G11B 5/84 156/234 |
| 8,896,969 B1 * | 11/2014 | Miller | .................. | G11B 5/4833 360/294.4 |
| 8,913,347 B2 * | 12/2014 | Takikawa | ............. | G11B 5/4873 360/245.3 |
| 8,934,203 B2 * | 1/2015 | Hanya | .................... | G11B 5/483 360/245.3 |
| 8,947,831 B1 * | 2/2015 | Ee | ......................... | G11B 5/483 360/245.3 |

(Continued)

FOREIGN PATENT DOCUMENTS

JP            2006-099952 A       4/2006

*Primary Examiner* — Brian E Miller
(74) *Attorney, Agent, or Firm* — Oliff PLC

(57) ABSTRACT

A head support mechanism is provided with: a slider with a head element; a slider support plate; a load beam that holds the slider support plate; a fulcrum protrusion that is provided around a front end part of the load beam which supports the slider support plate; drive means that is configured to pivotally move the slider support plate centering on the fulcrum protrusion; and a drive means support portion that is provided to overlap and support the drive means. The drive means support portion has a narrow part and at least one wide part provided on a front end part side and a rear end part side of the load beam with respect to the narrow part. The drive means support portion is disposed at a position overlapping the fulcrum protrusion in a projection plane in a direction perpendicular to a main surface of the slider.

13 Claims, 12 Drawing Sheets

(56) References Cited

U.S. PATENT DOCUMENTS

| | | | | |
|---|---|---|---|---|
| 9,042,056 B2* | 5/2015 | Hanya | ................. | G11B 5/4826 |
| | | | | 360/294.4 |
| 9,070,392 B1* | 6/2015 | Bjorstrom | ............ | G11B 5/4833 |
| 9,564,154 B2* | 2/2017 | Bjorstrom | .............. | G11B 5/483 |
| 9,824,704 B2* | 11/2017 | Cray | ................... | B32B 37/1207 |
| 2011/0211274 A1* | 9/2011 | Kuwajima | ........... | G11B 5/4833 |
| | | | | 360/71 |
| 2014/0022674 A1* | 1/2014 | Takikawa | ............. | G11B 5/4813 |
| | | | | 360/244.5 |
| 2014/0168821 A1* | 6/2014 | Miller | ................. | G11B 5/4826 |
| | | | | 360/245.7 |
| 2016/0267928 A1* | 9/2016 | Kuwajima | ........... | G11B 5/4826 |

* cited by examiner

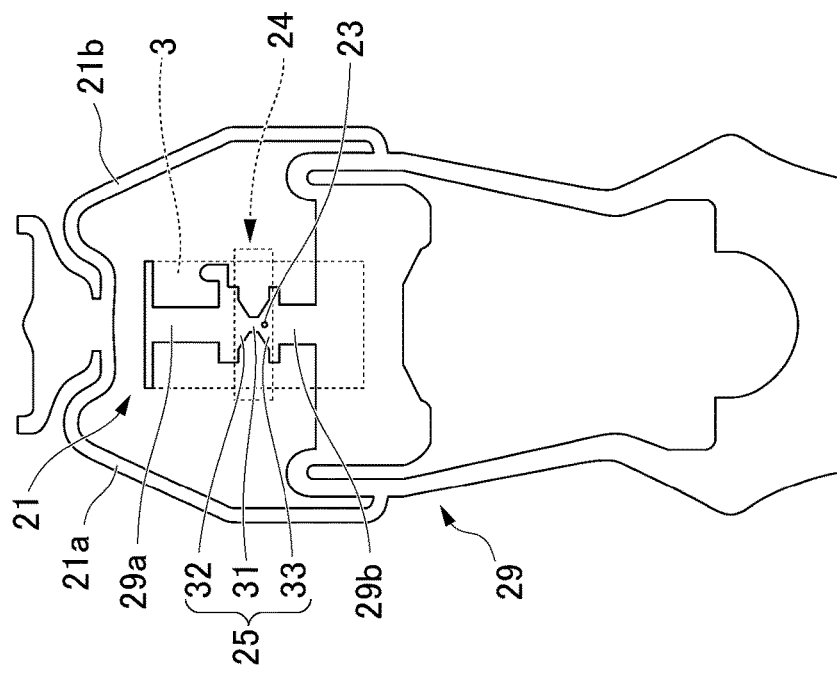
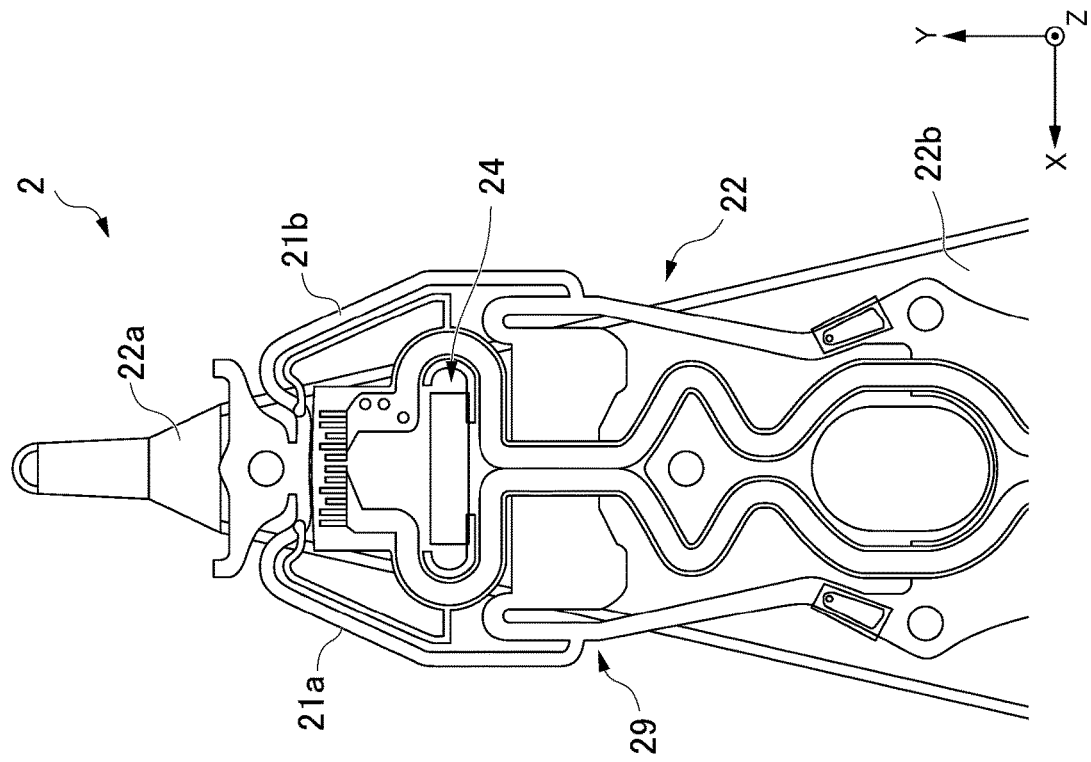

HEAD SUPPORT MECHANISM FOR A MAGNETIC DISK DRIVE WITH A SLIDER THAT HAS A HEAD ELEMENT

CROSS-REFERENCE TO RELATED APPLICATION

Priority is claimed on Japanese Patent Application No. 2018-208869, filed Nov. 6, 2018, the content of which is incorporated herein by reference.

BACKGROUND

The present disclosure relates to a head support mechanism and a magnetic disk device, and particularly to a head support mechanism that pivotably supports a head element provided in a magnetic disk device.

In recent years, high-density recording of a magnetic disk provided in a magnetic disk device has progressed along with an increase in a data capacity and the need for miniaturization. In order to realize high-density recording of a magnetic disk, it is necessary to position a magnetic head to a recording track of a magnetic disk with high accuracy. Therefore, in the related art, there is a head support mechanism that finely drives a head support spring mechanism supporting a magnetic head with a piezoelectric element.

As the head support mechanism, for example, a head support mechanism including a magnetic head slider, a micro-actuator that horizontally rotates the magnetic head slider with a central part of the magnetic head slider as an axis, and a suspension that supports the magnetic head slider and the micro-actuator (see Japanese Unexamined Patent Application, First Publication No. 2006-99952). In the head support mechanism, the micro-actuator is provided with a support frame having a base part, a movable plate part, and a lead beam connecting the base part to the movable plate, and two piezoelectric members connecting the base part to the movable plate, and the lead beam has a pivot part assisting with horizontal swing of the magnetic head slider.

However, in the related art, a pair of piezoelectric members are provided on both sides of the support frame, and thus cost of the two piezoelectric members is high. In the related art, since the pair of piezoelectric members are provided on both sides of the support frame, and the piezoelectric members and a fulcrum protrusion are located to be separated from each other, a displacement amount of the head element is low. In the related art, in a case where the piezoelectric members are made to close to the fulcrum protrusion in order to increase a displacement amount of the head element, a resonance frequency peak is reduced, and thus frequency response characteristics of the head element deteriorate.

An object of the present disclosure is to provide a head support mechanism and a magnetic disk device capable of reducing cost, and improving frequency response characteristics while increasing a displacement amount of a head element.

SUMMARY OF THE INVENTION

In order to achieve the object, the present disclosure provides the following means.

A head support mechanism including:
a slider that has a head element;
a slider support plate that supports the slider;
a load beam that holds the slider support plate;
a fulcrum protrusion that is provided around a front end part of the load beam, and rotatably supports the slider support plate;
drive means that is configured to pivotally move the slider support plate centering on the fulcrum protrusion; and
a drive means support portion that is provided to overlap the drive means, and supports the drive means,
in which the drive means support portion has a narrow part and at least one wide part provided on at least one of a front end part side and a rear end part side of the load beam with respect to the narrow part, and
in which the drive means support portion is disposed at a position overlapping the fulcrum protrusion in a projection plane in a direction perpendicular to a main surface of the slider.

BRIEF DESCRIPTION OF THE DRAWINGS

FIG. 5A is a partial plan view schematically showing a configuration of the head support mechanism in FIG. 3, and FIG. 5B is a plan view showing a positional relationship among a slider, drive means, and a drive means support portion configuring the head support mechanism.

DETAILED DESCRIPTION

Hereinafter, an embodiment of the present disclosure will be described in detail with reference to the drawings.

[Configuration of Magnetic Disk Device]

Figure 1:
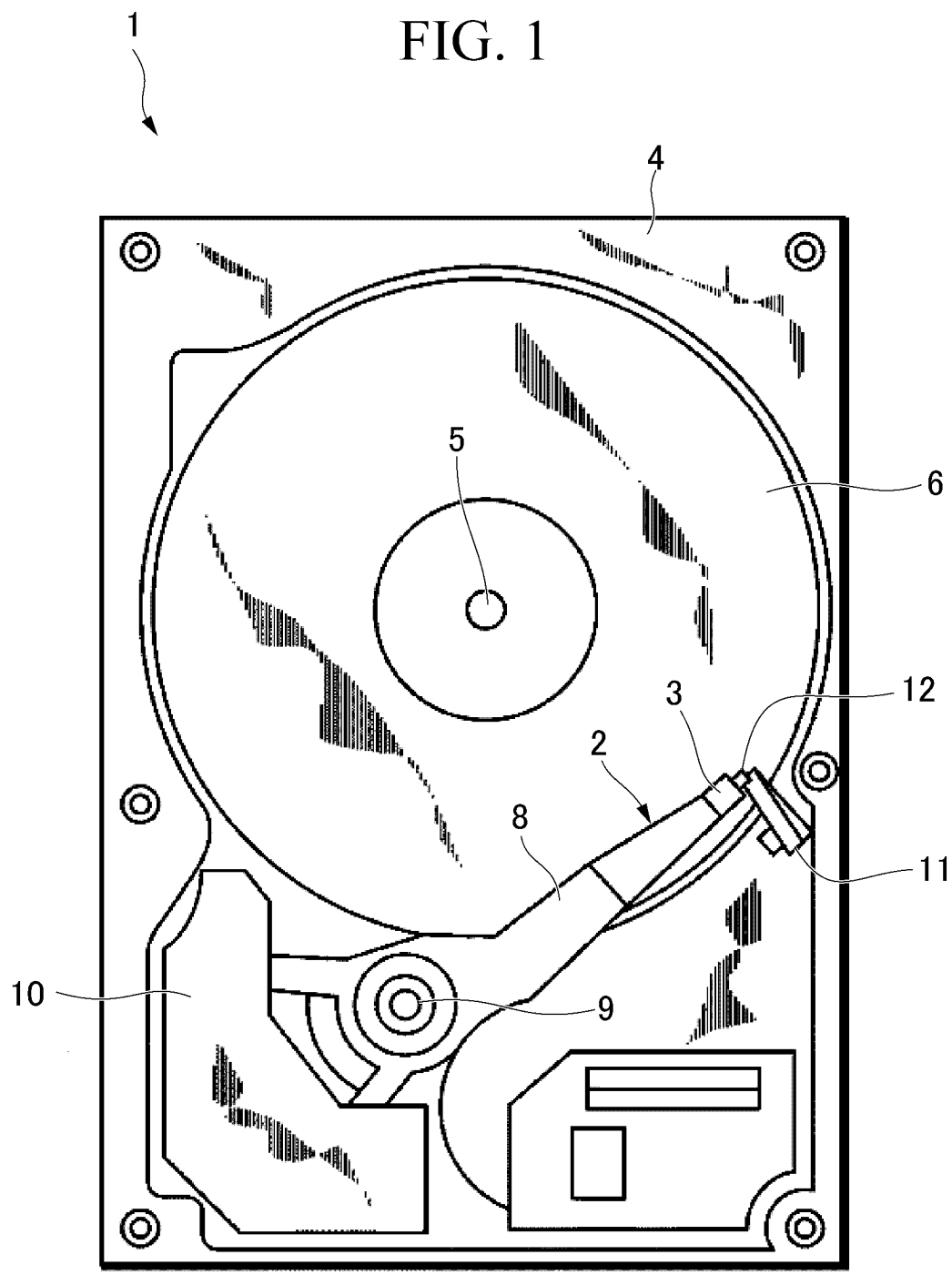
FIG. 1 is a plan view schematically showing a configuration of a magnetic disk device according to an embodiment of the present disclosure.

FIG. 1 is a plan view schematically showing a configuration of a magnetic disk device according to the present embodiment. In the present embodiment, a load/unload type magnetic disk device (HDD device) provided with a head support mechanism will be described as an example. In the drawings used in the following description, for convenience, there is a case where a feature portion is shown to be enlarged, and thus a dimension ratio of each constituent element is not limited to an shown one.

As shown in FIG. 1, a magnetic disk device 1 of the present embodiment includes a housing 4, a magnetic disk 6 that is rotatably driven by a spindle motor centering on a shaft 5, a head support mechanism 2 having a slider 3, and a support arm 8 that supports the head support mechanism 2 at a front end part.

A coil portion of a voice coil motor (VCM) (not shown) is attached to a rear end part of the support arm 8. The support arm 8 is pivotably moved in parallel to a surface of the magnetic disk 6 centering on a horizontal pivot shaft 9. The VCM has the coil portion (not shown) and a magnet portion 10 covering the coil portion. A lamp mechanism 11 is provided over the outside of the magnetic disk 6 from the outside of a data region of the magnetic disk 6. A tab 12 provided at the frontmost end of the head support mechanism 2 gets on an inclined surface of the lamp mechanism 11, and thus the slider 3 is separated from the magnetic disk 6 to enter an unload state.

During an operation (during high speed rotation of the magnetic disk) of the magnetic disk device 1, the slider 3 floats over the surface of the magnetic disk 6 in a slight floating amount, and enters a load state. On the other hand, during a non-operation (during stoppage of the magnetic disk or during low speed rotation at the time of starting or stopping), the tab 12 of the front end part of the head support mechanism 2 gets on the lamp mechanism 11, and thus the slider 3 enters an unload state.

[Configuration of Head Support Mechanism]

Figure 2:
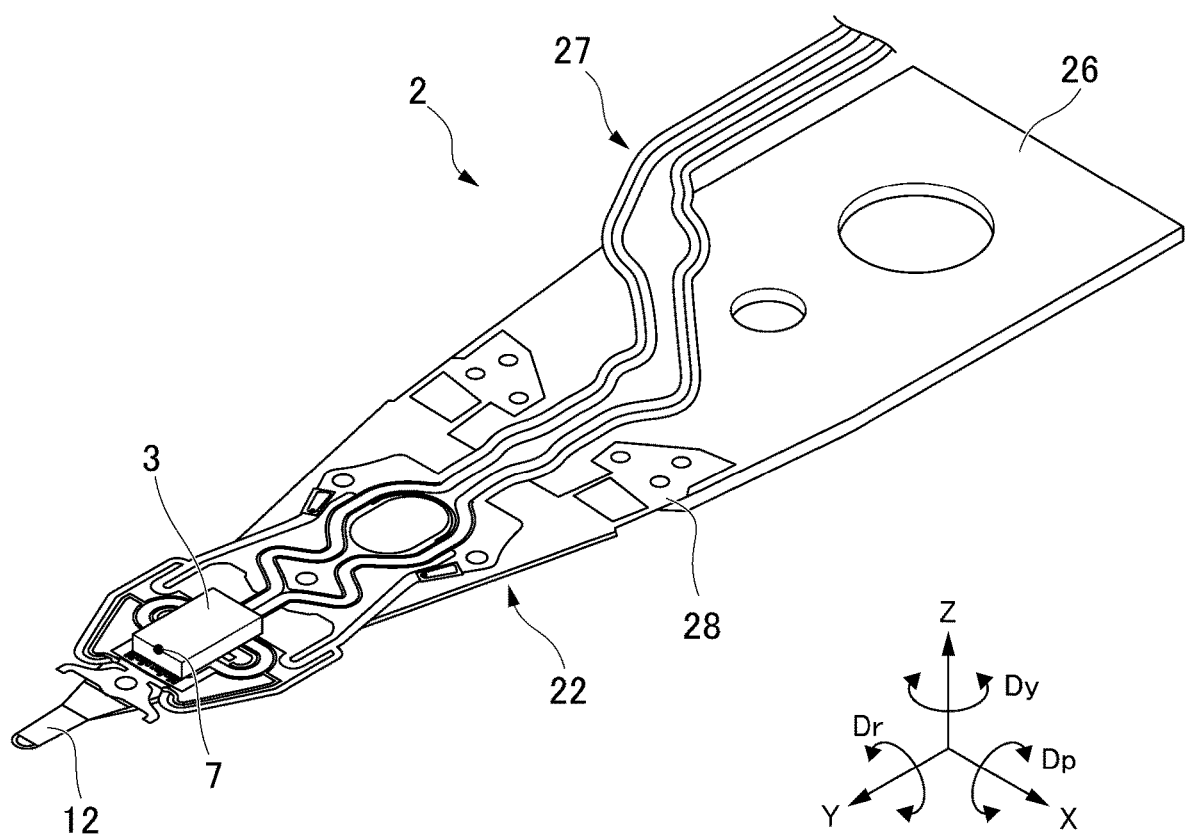
FIG. 2 is a perspective view schematically showing a configuration of a head support mechanism in FIG. 1.
Figure 3:
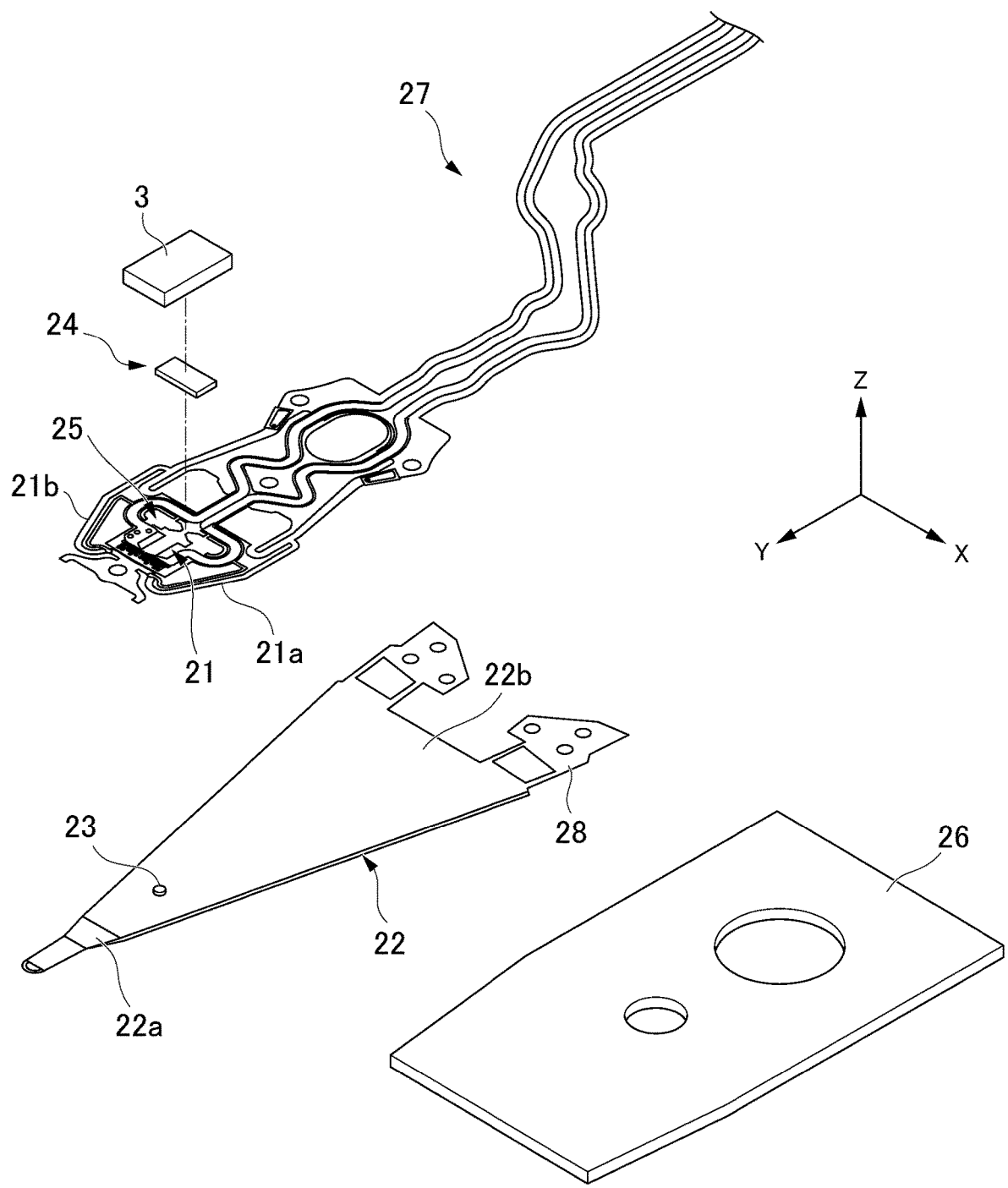
FIG. 3 is an exploded perspective view showing the head support mechanism in FIG. 2.

FIG. 2 is a perspective view schematically showing a configuration of the head support mechanism 2 in FIG. 1, and FIG. 3 is an exploded perspective view showing the head support mechanism 2 in FIG. 2. For convenience of description, in some cases, a positive Z axis direction in the figure will be referred to as an upper surface side of the head support mechanism 2, and a negative Z axis direction will be referred to as a lower surface side or a bottom surface side of the head support mechanism 2. In FIG. 2, Dp indicates a pitch direction of the slider 3, Dr indicates a roll direction, and Dy indicates a yaw direction.

As shown in FIGS. 2 and 3, the head support mechanism 2 includes the slider 3 having a head element 7; a slider support plate 21 supporting the slider 3; a load beam 22 supporting the slider support plate 21; a fulcrum protrusion 23 that is provided around a front end part 22a of the load beam 22 and rotatably supports the slider support plate 21; drive means 24 that is configured to pivotally move the slider support plate 21 centering on the fulcrum protrusion 23; and a drive means support portion 25 that is provided to overlap the drive means 24 and supports the drive means 24. The head support mechanism 2 further includes a base plate 26 that is attachable to the front end part of the support arm 8 and a flexure 27 configuring a wiring board.

The slider 3 is fixed onto the slider support plate 21 provided on the flexure 27. The slider 3 is provided with an inductive write-in head element and the head element 7 configured with an MR read thin film magnetic head such as a giant magnetoresistive (GMR) read head element or a tunnel magnetoresistive (TMR) read head element on a rear end (a trailing edge; a positive Y axis direction side in FIG. 2) surface of the slider 3.

The slider support plate 21 is in point-contact with a centroid position of the slider 3 from the rear surface and is pivotally supported at the fulcrum protrusion 23. Therefore, the slider support plate 21 is supported at the load beam 22 in a pivot structure. A first outrigger 21a and a second outrigger 21b flexibly hold a pose of the slider 3. Consequently, the slider 3 performs smooth tracking in correspondence with a change in a pose due to undulation of the disk surface.

The load beam 22 is fixed to the base plate 26 via a plurality of beam welding parts. The load beam 22 has plate springs 28 at a rear end part 22b thereof, and pressing force caused by the plate springs 28 is applied between the fulcrum protrusion 23 and the slider support plate 21. Thus, the slider support plate 21 is in a state of being held by friction force caused by the pressing force.

The fulcrum protrusion 23 is formed to integrally protrude on a central line and around a front end part 22a of the load beam 22. In the present embodiment, the fulcrum protrusion 23 is in point-contact with a part of the drive means support portion 25.

The drive means 24 is, for example, a piezoelectric element, and is preferably a piezoelectric element having a laminated structure in which a plurality of piezoelectric materials are laminated. In a case where the drive means 24 is a piezoelectric element having a laminated structure, the rigidity of the drive means 24 can be improved. A piezoelectric material used in the piezoelectric element is, for example, a piezoelectric ceramic, and is preferably PZT. Details of the drive means 24 will be described later.

Figure 4:
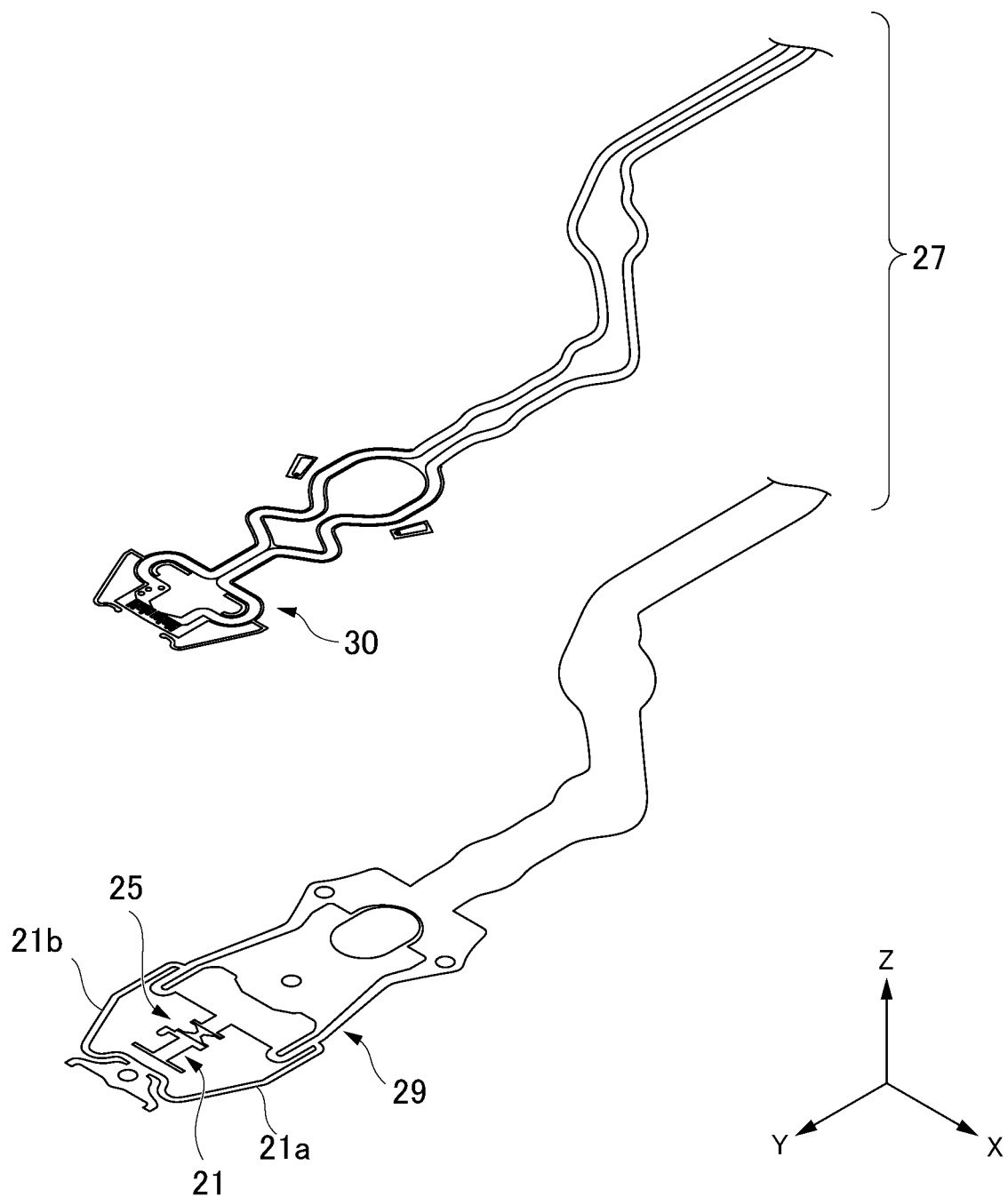
FIG. 4 is an exploded perspective view showing a flexure in FIG. 3.

FIG. 4 is an exploded perspective view showing the flexure 27 in FIG. 3. The flexure 27 originally has an integrated configuration, but, for better understanding, FIG. 4 shows a flexure board and a head element wiring (wiring portion) separately from each other. As shown in FIG. 4, the flexure 27 has a flexure board 29 and a head element wiring 30. The flexure board 29 is formed of a metal substrate. The metal substrate forms a metal layer, and has, for example, a frame-shaped pattern. The head element wiring 30 has an insulating layer laminated on the metal substrate and a copper foil laminated on the insulating layer. The metal layer is made of, for example, iron, and the insulating layer is made of, for example, a polyimide resin. The flexure 27 is, for example, a wiring board in which an insulating layer with a thickness of about 10 μm is coated on a thin stainless steel sheet with a thickness of about 15 μm, and a copper foil is plated thereon, and is precisely processed to a predetermined shape by etching the stainless steel sheet, the insulating layer, and the copper foil in any shape.

FIG. 5A is a partial plan view schematically showing a configuration of the head support mechanism 2 in FIG. 3, and FIG. 5B is a plan view showing a positional relationship among the slider 3, the drive means 24, and the drive means support portion 25 configuring the head support mechanism 2. As shown in FIGS. 5A and 5B, the drive means support portion 25 has a narrow part 31 and a pair of wide parts 32 and 33 provided on both of the front end part 22a side and the rear end part 22b side of the load beam 22 with respect to the narrow part 31. The drive means support portion 25 has a length direction corresponding to a longitudinal direction of the load beam 22 and a width direction corresponding to a transverse direction of the load beam 22, and, in the present embodiment, the length direction of the drive means support portion 25 is a Y direction in the figures, and the width direction of the drive means support portion 25 is an X direction therein. The drive means support portion 25 is disposed at a position overlapping the fulcrum protrusion 23 in a projection plane perpendicular to a main surface of the slider 3.

In a plan view of the drive means support portion 25, the narrow part 31 and the pair of wide parts 32 and 33 have a substantially X-shaped outer edge shape (FIG. 5B). With this configuration, it is possible to increase a displacement amount of the slider 3, that is, the head element 7, and also to suppress resonance of the head element 7.

In the present embodiment, two wide parts are provided on both sides of the narrow part 31, but a single wide part may be provided on one side of the narrow part 31. In other words, the drive means support portion 25 may have a narrow part and at least one wide part provided on at least one of the front end part 22a side and the rear end part 22b side of the load beam 22 with respect to the narrow part.

In a plan view of the drive means support portion 25, the narrow part 31 and the wide part 32 have a linear outer edge shape, but are not limited thereto, and may have other shapes such as a curved shape or a stepped shape. The narrow part 31 and the wide part 33 have a linear outer edge shape, but are not limited thereto, and may have other shapes such as a curved shape or a stepped shape.

In the present embodiment, in the projection plane perpendicular to the main surface of the slider 3, the drive means support portion 25 is preferably disposed at a position included in the drive means 24, and the drive means 24 is preferably disposed at a position overlapping the slider 3 (FIG. 5B). In this case, in a plan view of the slider 3, a part of the drive means 24 may overlap the slider 3, and the whole of the drive means 24 may overlap the slider 3. As mentioned above, since the drive means support portion 25 is provided to overlap the drive means 24, and the drive means 24 is provided to overlap the slider 3, it is not necessary to provide a disposition space for the drive means 24 on a lateral side of the slider 3, and to improve response characteristics of the head element 7.

Figure 6A:
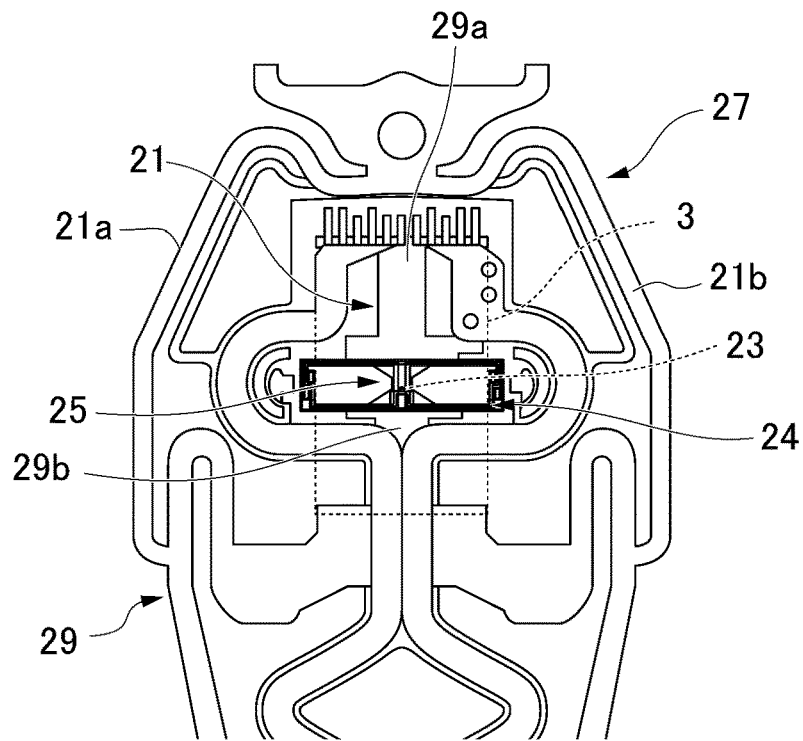
FIG. 6A is a partial plan view schematically showing a configuration of a flexure board.
Figure 6B:
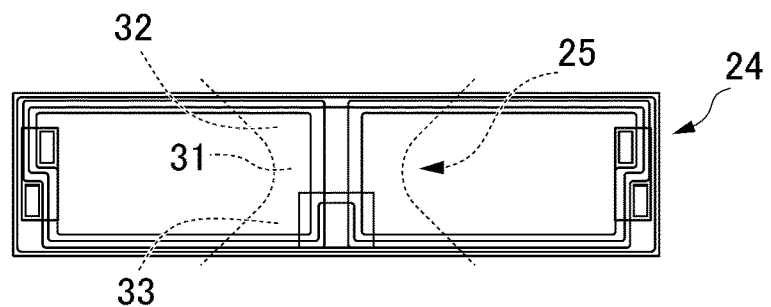
FIG. 6B is a plan view showing a configuration of the drive means.
Figure 6C:
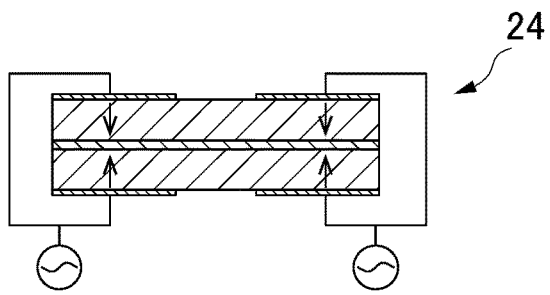
FIG. 6C is a schematic diagram for describing an electrical configuration of the drive means in FIG. 6B.

FIG. 6A is a partial plan view schematically showing a configuration of the flexure 27, FIG. 6B is a plan view showing a configuration of the drive means 24, and FIG. 6C is a schematic diagram for describing an electrical configuration of the drive means 24 in FIG. 6B. As shown in FIG. 6A, in a plan view, the flexure 27 is formed to be substantially linearly symmetric with respect to a straight line passing through the fulcrum protrusion 23 and connecting the front end part 22a side of the load beam 22 to the rear end part 22b side thereof (refer to FIG. 5A).

The flexure board 29 preferably has a first end part 29a located further toward the front end part 22a side (refer to FIG. 5A) of the load beam 22 than the drive means 24 and a second end part 29b located further toward the rear end part 22b side of the load beam 22 than the drive means 24. The first end part 29a indicates, for example, a front end part of a substantially T-shaped tongue piece configuring a part of the flexure board 29, and the second end part 29b indicates a rear end part of the tongue piece (refer to FIG. 5B). In this case, the slider 3 is fixed to the first end part 29a, and the first end part 29a and the second end part 29b are connected to each other via the drive means support portion 25. Consequently, it is possible to accurately position the slider 3 while increasing a displacement amount of the slider 3, and thus to further improve response characteristics of the slider 3.

The flexure 27 has at least the flexure board 29 formed of a metal substrate having a frame-shaped pattern. The narrow part 31 and the pair of wide parts 32 and 33 (refer to FIG. 5B) configure a part of the flexure board 29. In the present embodiment, of the flexure board 29 and the insulating layer configuring the flexure 27, the flexure board 29 has the narrow part 31 and the pair of wide parts 32 and 33, and thus the narrow part 31 is bent according to an operation of the drive means 24. In other words, the narrow part 31 functions as an elastic hinge. As mentioned above, the narrow part 31 and the pair of wide parts 32 and 33 are provided, and thus the drive means support portion 25 can be easily provided in the head support mechanism 2 without increasing the number of components.

In the present embodiment, the flexure board 29 may have the narrow part 31 and the pair of wide parts 32 and 33, and the insulating layer may not have a narrow part and a pair of wide parts. In other words, the insulating layer may have a shape that is different from that of the flexure board. However, the insulating layer may have a narrow part and a pair of wide parts corresponding to the narrow part 31 and the pair of wide parts 32 and 33 of the flexure board 29.

As shown in FIG. 6B, the drive means 24 is, for example, a rectangular piezoelectric element in a plan view, and is formed linearly symmetric with respect to a straight line passing through the fulcrum protrusion 23 and connecting the front end part 22a side of the load beam 22 to the rear end part 22b side thereof (refer to FIG. 5A). In other words, in a plan view of the flexure board 29, the drive means 24 is provided on the drive means support portion 25 such that a longitudinal direction central position of the drive means 24 matches a width direction central position of the drive means support portion 25. A dimension of the drive means 24 is not particularly limited, and is, for example, a length of 860 μm, a width of 220 μm, and a thickness of 8.95 μm.

In a case where the drive means 24 is a piezoelectric element having a laminated structure, as shown in FIG. 6C, the drive means 24 has, for example, two-layer piezoelectric materials respectively laminated on upper and lower sides of a central electrode, a pair of upper and lower electrodes respectively disposed on an upper surface of the upper piezoelectric material and a lower surface of the lower piezoelectric material, and another pair of upper and lower electrodes respectively disposed on the upper surface of the upper piezoelectric material and the lower surface of the lower piezoelectric material. A voltage is applied to the pair of upper and lower electrodes from the outside, and a voltage is also applied to another pair of upper and lower electrodes. A voltage may be applied to the pair of upper and lower electrodes from the outside, and another pair of upper and lower electrodes may be grounded. The two-layer piezoelectric materials are provided such that polarization directions thereof are all directed toward the central electrode from the pair of upper and lower elements (arrow directions in the figure), and are configured such that a potential of the central electrode is normally 0.

Figure 7A:
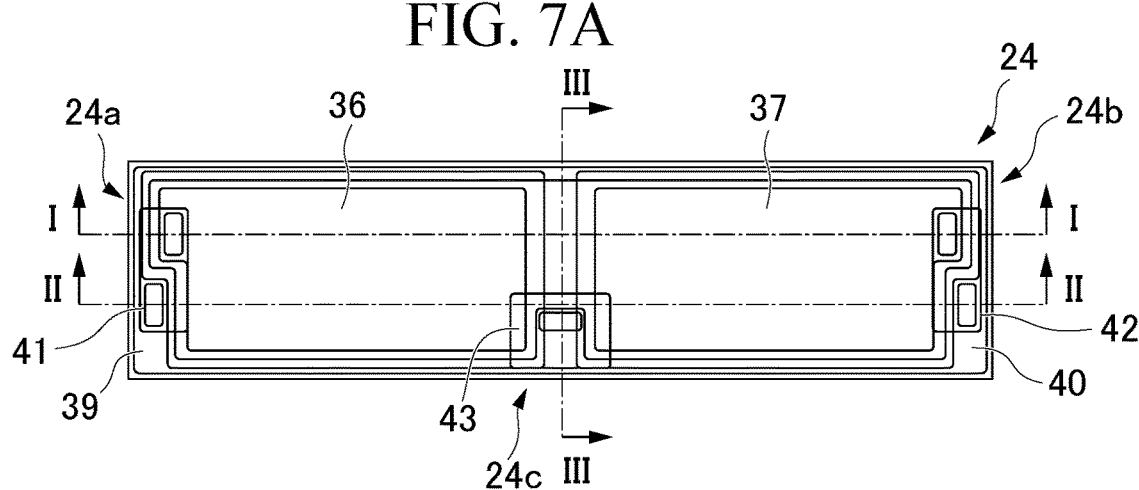
FIG. 7A is a plan view showing a specific configuration of the drive means in FIG. 6B.
Figure 7B:
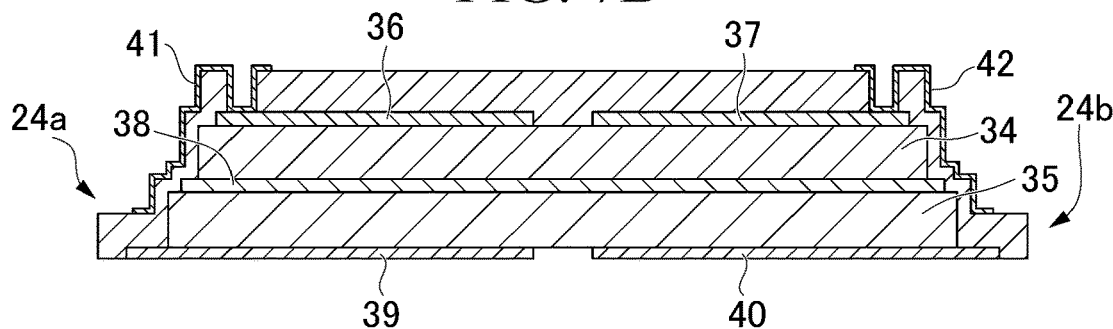
FIG. 7B is a sectional view taken along the line I-I.
Figure 7C:
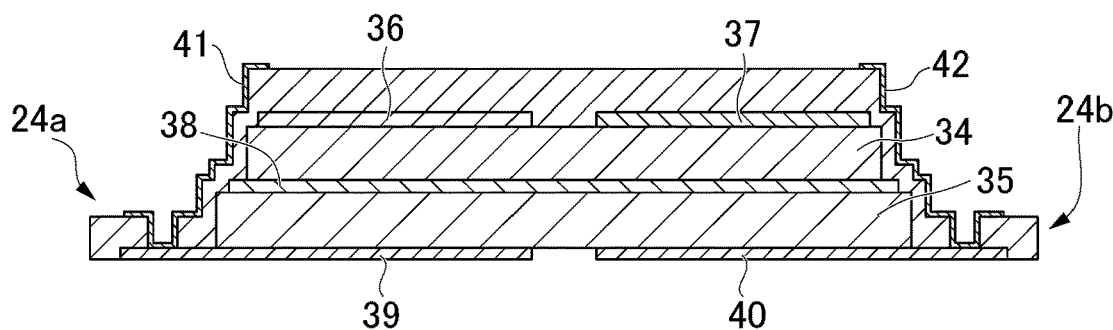
FIG. 7C is a sectional view taken along the line II-II.
Figure 7D:
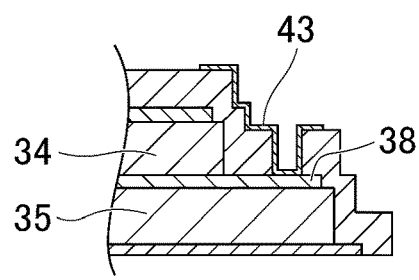
FIG. 7D is a sectional view taken along the line III-III.

FIG. 7A is a plan view showing a specific configuration of the drive means 24 in FIG. 6B, FIG. 7B is a sectional view taken along the line I-I, FIG. 7C is a sectional view taken along the line II-II, and FIG. 7D is a sectional view taken along the line III-III. As shown in FIGS. 7A to 7C, the drive means 24 has, for example, a first piezoelectric layer 34 and a second piezoelectric layer 35; a first electrode film 36 and a second electrode film 37 provided in the first piezoelectric layer 34; a third electrode film 38 provided between the first piezoelectric layer 34 and the second piezoelectric layer 35; a fourth electrode film 39 and a fifth electrode film 40 disposed to respectively oppose the first electrode film 36 and the second electrode film 37 on a side of the second piezoelectric layer 35 opposite to the third electrode film 38; a first pad 41 coupled to the first electrode film 36 and the fourth electrode film 39; a second pad 42 coupled to the second electrode film 37 and the fifth electrode film 40; and a third pad 43 provided on the third electrode film 38. The first electrode film 36 and the fourth electrode film 39 configure the pair of upper and lower electrodes, and the second electrode film 37 and the fifth electrode film 40 configure another pair of upper and lower electrodes.

The first pad 41 is disposed at one end part 24*a* of the drive means 24 in the longitudinal direction, and maintains the first electrode film 36 and the fourth electrode film 39 in the same potential. The second pad 42 is disposed at the other end part 24*b* of the drive means 24 in the longitudinal direction, and maintains the second electrode film 37 and the fifth electrode film 40 in the same potential. The first pad 41 and the second pad 42 are not particularly limited in disposition thereof, and may be disposed at positions other than the described positions. The third pad 43 is disposed between the first electrode film 36 and the second electrode film 37, and is preferably disposed at one end part 24*c* of the drive means 24 in the width direction. For example, in a manufacturing process, voltages are applied to the first pad 41 and the third pad 43, and thus polarization directions of the first piezoelectric layer 34 and the second piezoelectric layer 35 are aligned to face each other.

Figure 8:
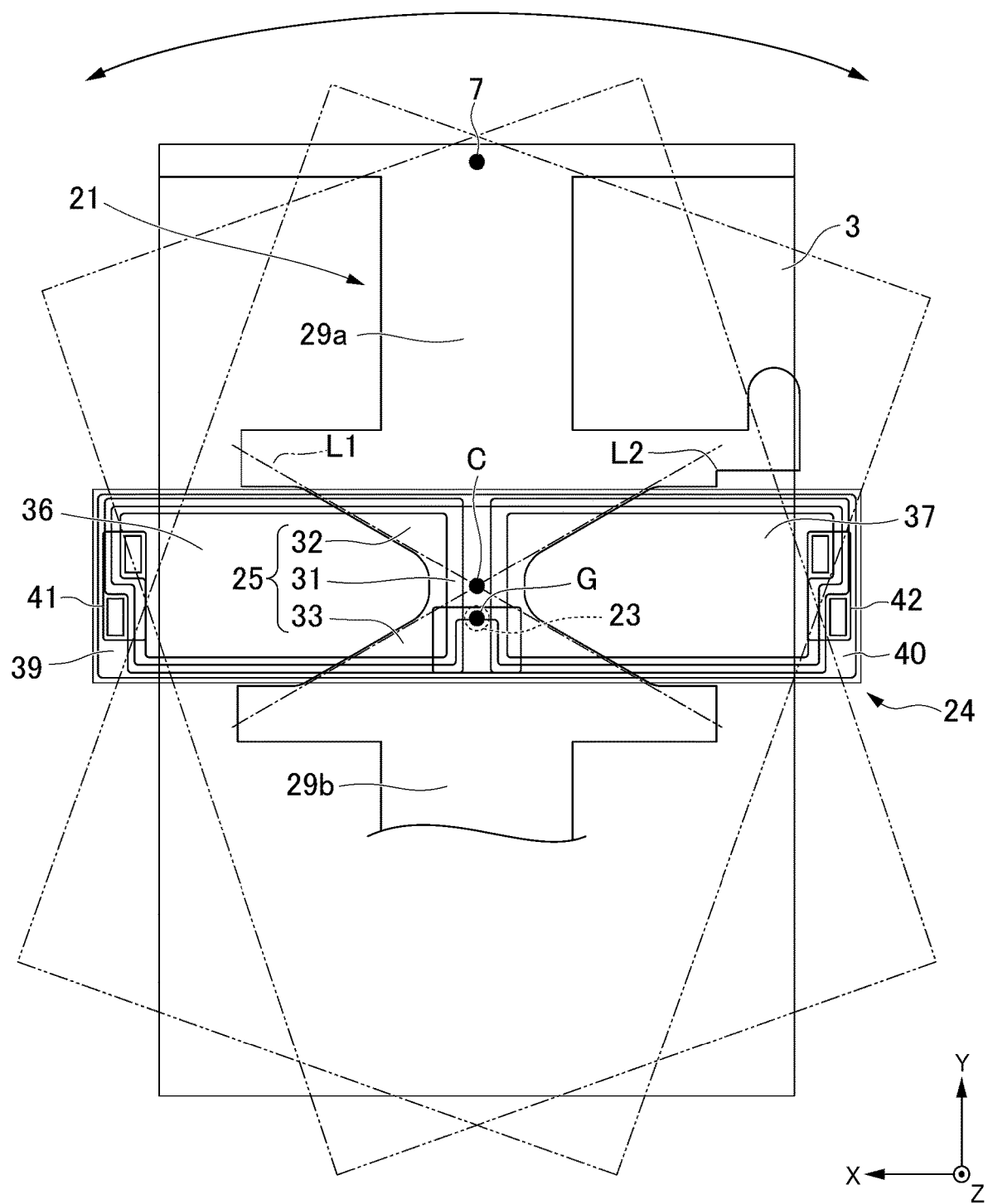
FIG. 8 is a plan view showing the slider that is pivotally moved via the drive means support portion by the drive means in FIGS. 5A and 5B.

FIG. 8 is a plan view showing the slider 3 that is pivotally moved via the drive means support portion 25 by the drive means 24 in FIGS. 5A and 5B. In the head support mechanism 2 configured as described above, in a case where a positive voltage (or a negative voltage) is supplied to the pair of upper and lower electrodes of the drive means 24, for example, the first electrode film 36 and the fourth electrode film 39, and a negative voltage (or a positive voltage) is applied to the second electrode film 37 and the fifth electrode film 40, the third electrode film 38 has zero potential, and thus the portion disposed between the first electrode film 36 and the fourth electrode film 39 (or the portion disposed between the second electrode film 37 and the fifth electrode film 40) is generally contracted due to the piezoelectric effect in the first piezoelectric layer 34 and the second piezoelectric layer 35 (refer to FIGS. 7A to 7D). In a case where the first piezoelectric layer 34 and the second piezoelectric layer 35 are contracted, the narrow part 31 of the drive means support portion 25 is bent in an X-Y plane. Due to deformation of the drive means support portion 25, rotation force in the yaw direction along a plane of the slider 3 is applied thereto, and thus the slider 3 is pivotally moved centering on the fulcrum protrusion 23 (arrow directions in the figure).

In a case where the first piezoelectric layer 34 and the second piezoelectric layer 35 are contracted, power is supplied to the two pairs of upper and lower electrodes, that is, the first electrode film 36 and the fourth electrode film 39, and the second electrode film 37 and the fifth electrode film 40. In this case, an AC voltage supplied to the first electrode film 36 and the fourth electrode film 39 has a phase opposite to a phase of an AC voltage supplied to the second electrode film 37 and the fifth electrode film 40, and thus a displacement amount of the slider 3 can be further increased.

As described above, the fulcrum protrusion 23 is disposed at a centroid position G of the slider 3. The narrow part 31 and the pair of wide parts 32 and 33 may have an outer edge shape along a hyperbola $(x^2/a^2 - y^2/b^2 = 1)$ on an X-Y plane in which the width direction of the drive means support portion 25 is set to an X direction, and a direction directed toward the front end part 22*a* side from the rear end part 22*b* side of the load beam 22 is set to a Y direction. In this case, an intersection C of two asymptotes L1 and L2 present in the hyperbola is preferably located further toward the head element 7 side than the fulcrum protrusion 23. Consequently, it is possible to maximize a displacement amount of the slider 3.

Figure 9A:
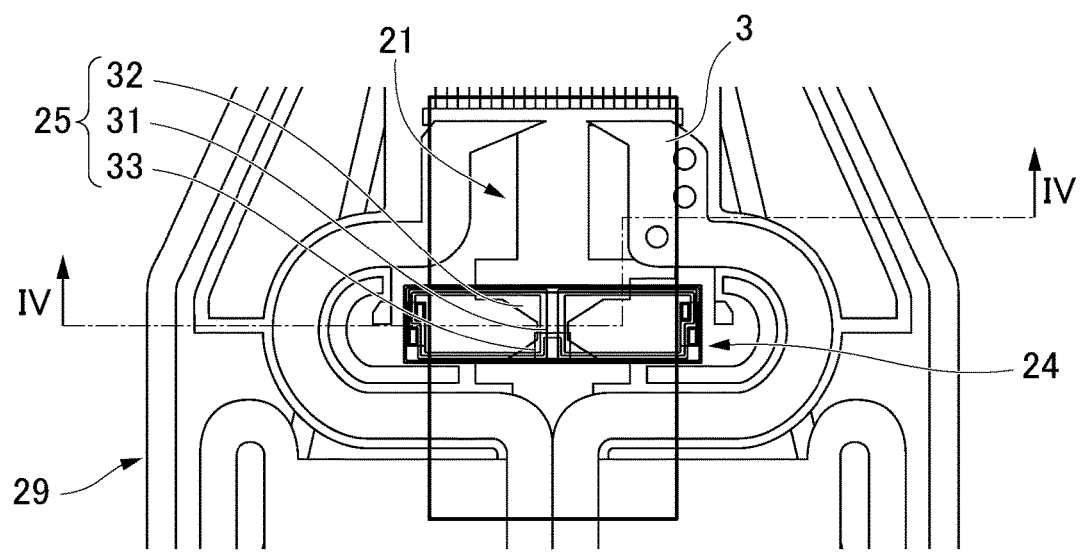
FIG. 9A is a plan view showing a sectional position of the head support mechanism.
Figure 9B:
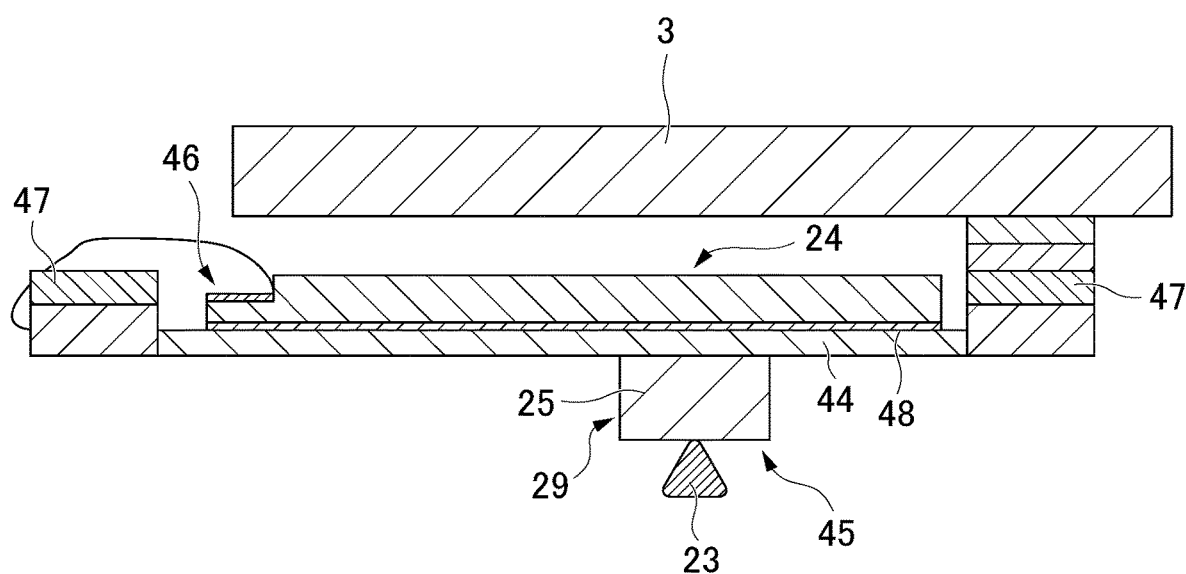
FIG. 9B is a sectional view taken along the line IV-IV.

FIG. 9A is a plan view showing a sectional position of the head support mechanism 2, and FIG. 9B is a sectional view taken along the line IV-IV. In FIGS. 9A and 9B, as an example, a description will be made of a case where the flexure board 29 is a metal substrate having a frame-shaped pattern, and the drive means support portion 25 forms a part of the metal substrate. The drive means 24 is attached to a surface of an insulating layer 44 opposite side to a metal substrate 45. The drive means 24 is disposed directly under the slider 3, and the drive means support portion 25 configuring a part of the metal substrate 45 is disposed directly under the drive means 24. The fulcrum protrusion 23 is disposed directly under the drive means support portion 25.

The drive means 24 may be provided at a recessed part 46 provided in the flexure board 29. In this case, for example, the whole of a copper foil 47 and a part of the insulating layer 44 are etched in a predetermined region of the flexure board 29, and the drive means 24 is disposed on the remaining insulating layer 44 except the etched portion via an adhesive layer 48. As mentioned above, the drive means 24 is provided within a thickness range of the flexure board 29, and thus it is possible to suppress an increase of a thickness of the head support mechanism 2.

Figure 10A:
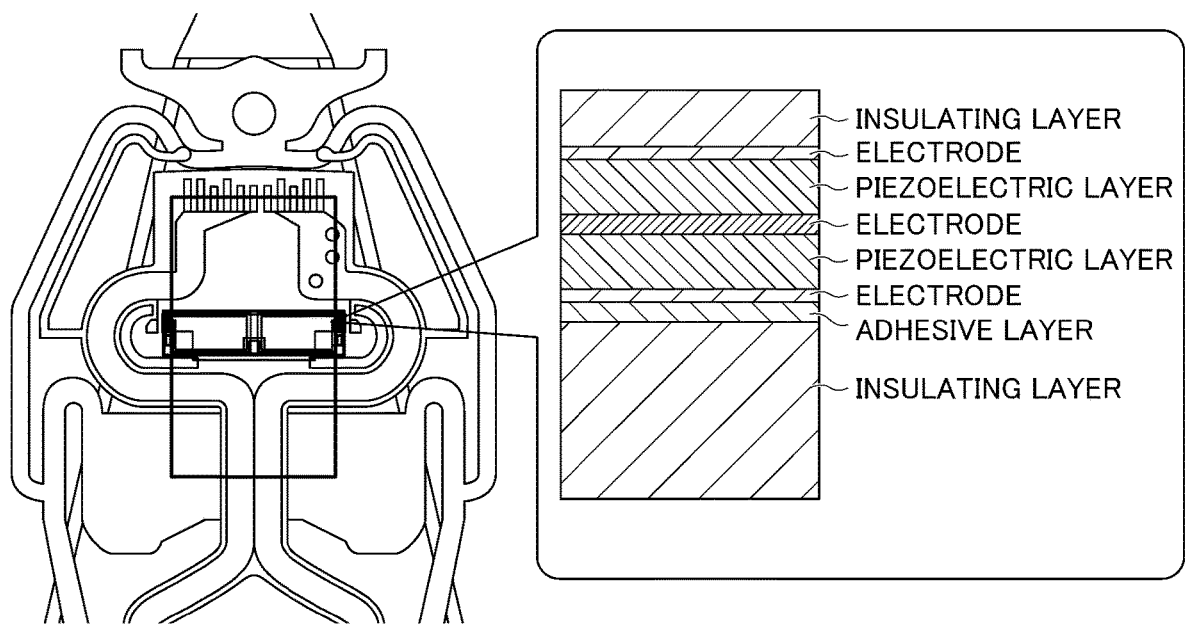
FIG. 10A is a diagram showing examples of configurations of the head support mechanism and the drive means according to the present embodiment.
Figure 10B:
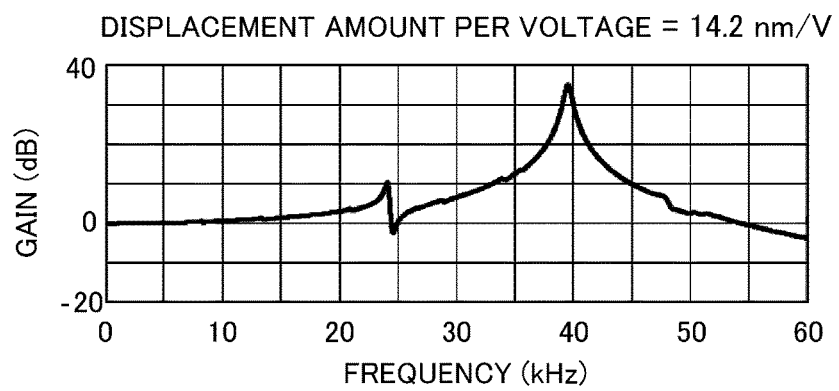
FIG. 10B is a graph showing a frequency-gain characteristic thereof.
Figure 11A:
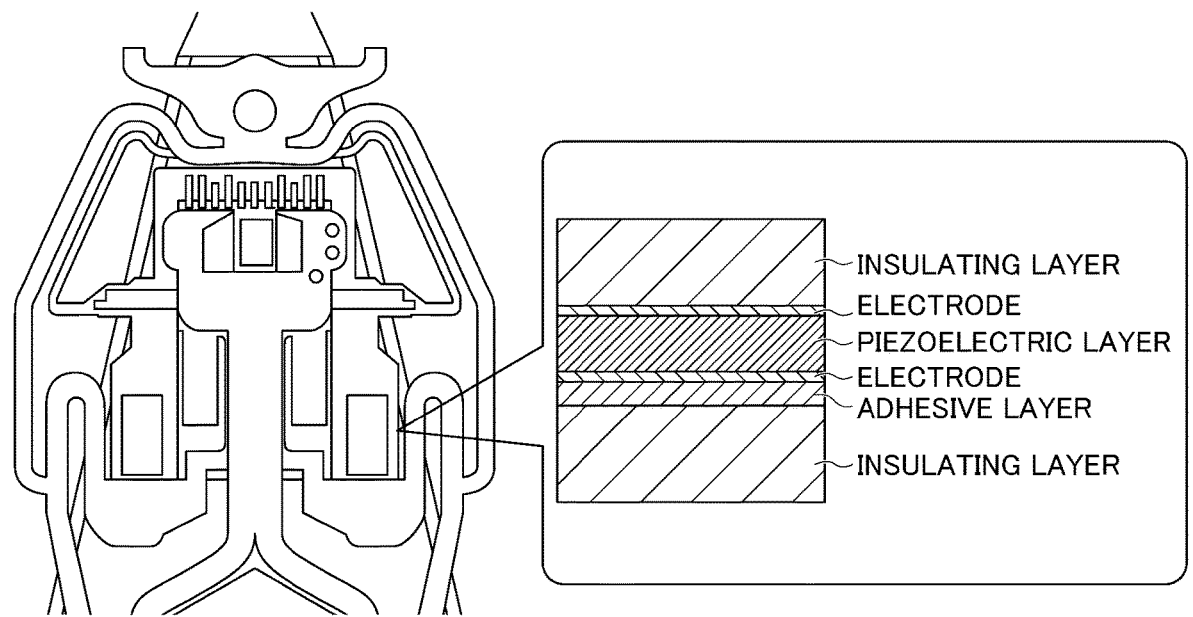
FIG. 11A is a diagram showing examples of configurations of a head support mechanism and drive means of the related art.
Figure 11B:
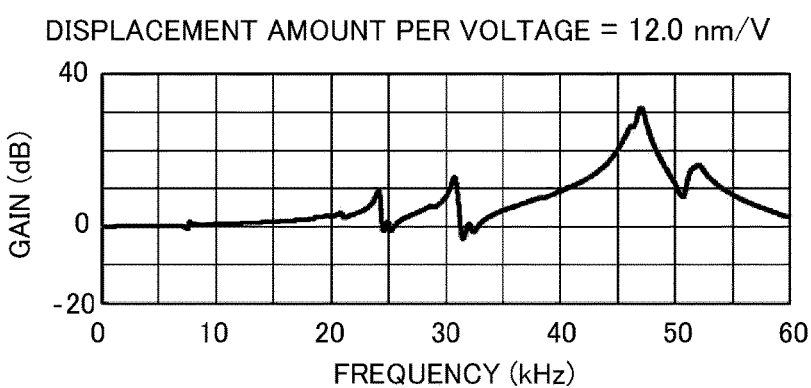
FIG. 11B is a graph showing a frequency-gain characteristic thereof.

FIG. 10A is a diagram showing examples of configurations of the head support mechanism and the drive means according to the present embodiment, and FIG. 10B is a graph showing a frequency-gain characteristic (dB) thereof. FIG. 11A is a diagram showing examples of configurations of a head support mechanism and drive means of the related art, and FIG. 11B is a graph showing a frequency-gain characteristic (dB) thereof. In a case of the head support mechanism according to the present embodiment, as shown in FIG. 10B, a peak of a resonance frequency of about 36 dB is generated around 39 kHz. On the other hand, in a case of the head support mechanism of the related art, as shown in FIG. 11B, a peak of a resonance frequency of about 31 dB is generated around 47 kHz. Therefore, it can be checked that the frequency response characteristics of the head support mechanism according to the present embodiment are improved more than those of the head support mechanism of the related art.

As a result of measuring a displacement amount (stroke) of each head support mechanism, a displacement amount per voltage of the head support mechanism according to the present embodiment is 14.2 nm/V, and a displacement amount per voltage of the head support mechanism of the related art is 12.0 nm/V. Therefore, it can be checked that a displacement amount of the head support mechanism according to the present embodiment is increased more than that of the head support mechanism of the related art.

As described above, according to the present embodiment, since the drive means 24 pivotally moves the slider support plate 21 centering on the fulcrum protrusion 23, the head element 7 can be displaced by a single piece of drive means, and thus it is possible to reduce cost compared with a configuration in which a plurality of pieces of drive means. The drive means support portion 25 is provided to overlap the drive means 24, and thus it is possible to realize miniaturization of the head support mechanism 2. The drive means support portion 25 includes the narrow part 31 and the pair of wide parts 32 and 33 provided on both of the front end part 22*a* side and the rear end part 22*b* side of the load beam 22 with respect to the narrow part 31, and, in the projection plane perpendicular to the main surface of the slider 3, the drive means support portion 25 is disposed at the position overlapping the fulcrum protrusion 23. Therefore, the narrow part 31 is bent, and thus a displacement amount of the head element 7 is increased, and the pair of wide parts 32 and 33 are relatively hardly bent, so that resonance of the head element 7 can be suppressed. As a result, frequency response characteristics of the head element 7 can be improved.

The narrow part 31 and the pair of wide parts 32 and 33 have an outer edge shape along the hyperbola ($x^2/a^2 - y^2/b^2 = 1$) on an X-Y plane in which the width direction of the drive means support portion 25 is set to an X direction, and a direction directed toward the front end part 22a side from the rear end part 22b side of the load beam 22 is set to a Y direction, and the intersection C of the two asymptotes L1 and L2 present in the hyperbola is located further toward the head element 7 side than the fulcrum protrusion 23. Therefore, it is possible to maximize a displacement amount of the slider 3 and thus to further improve frequency response characteristics of the head element 7.

The drive means 24 is a piezoelectric element having a laminated structure in which a plurality of piezoelectric materials are laminated. Therefore, the piezoelectric element can be configured to be compact, and thus the head support mechanism 2 can be further miniaturized.

While preferred embodiments of the invention have been described and shown above, it should be understood that these are exemplary of the invention and are not to be considered as limiting. Additions, omissions, substitutions, and other modifications can be made without departing from the spirit or scope of the present disclosure. Accordingly, the invention is not to be considered as being limited by the foregoing description, and is only limited by the scope of the appended claims.

Figure 12:
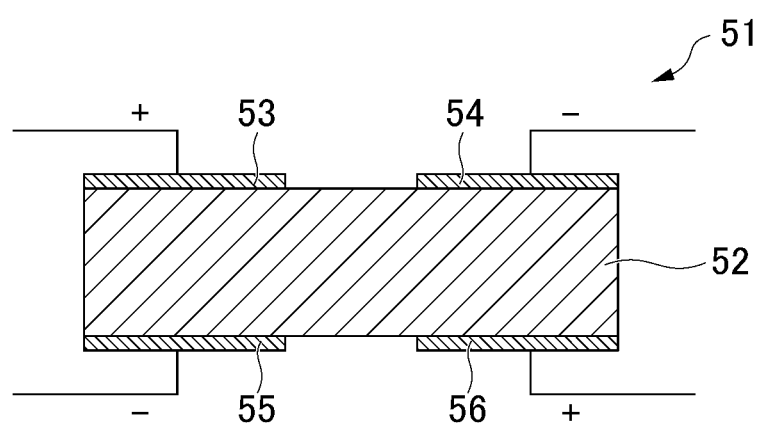
FIG. 12 is a sectional view showing a modification example of the drive means in FIG. 6C.

For example, in the present embodiment, the drive means has a laminated structure in which a plurality of piezoelectric materials are laminated, but may have a single piezoelectric layer. As shown in FIG. 12, drive means 51 has, for example, a single piezoelectric layer 52, a first electrode film 53 and a second electrode film 54 provided in the piezoelectric layer 52, and a third electrode film 55 and a fourth electrode film 56 disposed to respectively oppose the first electrode film 53 and the second electrode film 54. The first electrode film 53 and the third electrode film 55 configure a pair of upper and lower electrodes, and the second electrode film 54 and the fourth electrode film 56 configure another pair of upper and lower electrodes. In a case where a positive voltage (or a negative voltage) is supplied to the first electrode film 53 and the third electrode film 55, and a negative voltage (or a positive voltage) is applied to the second electrode film 54 and the fourth electrode film 56, a portion disposed between the first electrode film 53 and the third electrode film 55 (or a portion disposed between the second electrode film 54 and the fourth electrode film 56) is generally contracted due to the piezoelectric effect in the piezoelectric layer 52. According to this configuration, a piezoelectric element can be configured to be compact and simple, and thus it is possible to further miniaturize and simplify the head support mechanism 2.

While preferred embodiments of the disclosure have been described and shown above, it should be understood that these are exemplary of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

What is claimed is:

1. A head support mechanism comprising:
   a slider that has a head element;
   a slider support plate that supports the slider;
   a load beam that holds the slider support plate;
   a fulcrum protrusion that is provided around a front end part of the load beam, and rotatably supports the slider support plate;
   drive means that is configured to pivotally move the slider support plate centering on the fulcrum protrusion; and
   a drive means support portion that is provided to overlap the drive means, and supports the drive means,
   wherein the drive means support portion has a narrow part and at least one wide part provided on at least one of a front end part side and a rear end part side of the load beam with respect to the narrow part, and
   wherein the drive means support portion is disposed at a position overlapping the fulcrum protrusion in a projection plane in a direction perpendicular to a main surface of the slider.

2. The head support mechanism according to claim 1, further comprising:
   a flexure that is configured to form a wiring board,
   wherein the flexure has at least a flexure board formed of a metal substrate, and
   wherein the narrow part and the at least one wide part configure a part of the flexure board.

3. The head support mechanism according to claim 2,
   wherein the flexure has a flexure board formed of a metal substrate, and an insulating layer laminated on the metal substrate,
   wherein the drive means support portion forms a part of the flexure board formed of the metal substrate in the flexure, and
   wherein the drive means is attached to a surface of the insulating layer on an opposite side to the metal substrate.

4. The head support mechanism according to claim 1,
   wherein the drive means support portion has a narrow part and a pair of wide parts provided on both of the front end part side and the rear end part side of the load beam with respect to the narrow part,
   wherein the narrow part and the pair of wide parts have an outer edge shape along a hyperbola ($x^2/a^2 - y^2/b^2 = 1$) on an X-Y plane in which a width direction of the drive means support portion is set to an X direction, and a direction directed toward the front end part side from the rear end part side of the load beam is set to a Y direction, and
   wherein an intersection of two asymptotes present in the hyperbola is located further toward the head element side than the fulcrum protrusion.

5. The head support mechanism according to claim 2,
   wherein the drive means support portion has a narrow part and a pair of wide parts provided on both of the front end part side and the rear end part side of the load beam with respect to the narrow part,
   wherein the narrow part and the pair of wide parts have an outer edge shape along a hyperbola ($x^2/a^2 - y^2/b^2 = 1$) on an X-Y plane in which a width direction of the drive means support portion is set to an X direction, and a direction directed toward the front end part side from the rear end part side of the load beam is set to a Y direction, and wherein an intersection of two asymptotes present in the hyperbola is located further toward the head element side than the fulcrum protrusion.

6. The head support mechanism according to claim 1, wherein, in the projection plane in the direction perpendicular to the main surface of the slider, the drive means support portion is disposed at a position included in the drive means, and the drive means is disposed at a position overlapping the slider.

7. The head support mechanism according to claim 2, wherein, in the projection plane in the direction perpendicular to the main surface of the slider, the drive means support portion is disposed at a position included in the drive means, and the drive means is disposed at a position overlapping the slider.

8. The head support mechanism according to claim 2, wherein the flexure board has
a first end part located further toward the front end part side of the load beam than the drive means, and
a second end part located further toward the rear end part side of the load beam than the drive means,
wherein the slider is fixed to the first end part, and
wherein the first end part is connected to the second end part via the drive means support portion.

9. The head support mechanism according to claim 3, wherein the flexure board has
a first end part located further toward the front end part side of the load beam than the drive means, and
a second end part located further toward the rear end part side of the load beam than the drive means,
wherein the slider is fixed to the first end part, and
wherein the first end part is connected to the second end part via the drive means support portion.

10. The head support mechanism according to claim 1, wherein the drive means is a piezoelectric element having a single piezoelectric material or a laminated structure in which a plurality of piezoelectric materials are laminated.

11. The head support mechanism according to claim 10, wherein the drive means has
a single piezoelectric layer, and
a first electrode film and a second electrode film provided in the piezoelectric layer, and a third electrode film and a fourth electrode film disposed to respectively oppose the first electrode film and the second electrode film.

12. The head support mechanism according to claim 10, wherein the drive means has
a first piezoelectric layer and a second piezoelectric layer,
a first electrode film and a second electrode film provided in the first piezoelectric layer, a third electrode film provided between the first piezoelectric layer and the second piezoelectric layer, and a fourth electrode film and a fifth electrode film disposed to respectively oppose the first electrode film and the second electrode film on a side of the second piezoelectric layer opposite to the third electrode film, and
a first pad coupled to the first electrode film and the fourth electrode film, a second pad coupled to the second electrode film and the fifth electrode film, and a third pad provided on the third electrode film.

13. The head support mechanism according to claim 12, wherein, in a plan view of the drive means, the third pad is disposed between the first electrode film and the second electrode film.

* * * * *